United States Patent [19]

Nishimori et al.

[11] Patent Number: 5,052,506

[45] Date of Patent: Oct. 1, 1991

[54] CONTROL VALVE AND FOUR-WHEEL STEERING SYSTEM INCLUDING CONTROL VALVE

[75] Inventors: Masayoshi Nishimori; Hiroyuki Masuda, both of Okazaki, Japan

[73] Assignees: Mitsubishi Jidosha Kogyo Kabushiki Kaisha; Mitsubishi Jidosha Engineering Kabushiki Kaisha, both of Tokyo, Japan

[21] Appl. No.: 510,044

[22] Filed: Apr. 17, 1990

[30] Foreign Application Priority Data

Jun. 15, 1989 [JP] Japan .................................. 1-153167

[51] Int. Cl.$^5$ .............................................. B62D 5/08
[52] U.S. Cl. .................................... 180/140; 180/143; 137/625.66; 91/517; 91/529
[58] Field of Search ............... 180/140, 143, 142, 141; 280/91; 137/625.66; 91/517, 518, 529, 461

[56] References Cited

U.S. PATENT DOCUMENTS

| | | | |
|---|---|---|---|
| 4,119,172 | 10/1978 | Yanagishima | 180/141 |
| 4,579,186 | 4/1986 | Uno et al. | 180/141 |
| 4,669,567 | 6/1987 | Nakamura et al. | 280/91 |
| 4,781,262 | 11/1988 | Nakamura et al. | 180/140 |
| 4,811,805 | 3/1989 | Yoshida | 180/140 |
| 4,917,205 | 4/1990 | Kobayashi et al. | 91/517 |
| 4,923,170 | 5/1990 | Takaoko et al. | 180/143 |

Primary Examiner—Kenneth R. Rice
Assistant Examiner—Anne Marie Boehler
Attorney, Agent, or Firm—Hedman, Gibson, Costigan & Hoare

[57] ABSTRACT

A control valve includes a first valve having a cylinder and a piston arranged in the cylinder. The piston defines in the cylinder a pressure receiving chamber and first and second output pressure chambers, and is moved by pilot pressure applied to the pressure receiving chamber to change volumes of the first and second output pressure chambers. The output pressure chambers are connected to each other through a throttle control valve which generates pressure difference corresponding to a rate of change in volumes of the output pressure chambers, between the output pressure chambers. A main valve is connected to the throttle control valve and includes an inlet port, output ports, and a valve member located between the input and output ports. The valve member is moved in accordance with the pressure difference between the first and second output pressure chambers to control hydraulic pressure output from the output ports.

14 Claims, 9 Drawing Sheets

CONTROL VALVE AND FOUR-WHEEL STEERING SYSTEM INCLUDING CONTROL VALVE

BACKGROUND OF THE INVENTION

1. Field of the Invention

The present invention relates to a control valve used for a hydraulic apparatus and, more particularly, to a control valve which can perform differential control and a four-wheel steering system including the control valve.

2. Description of the Related Art

A hydraulic apparatus which can perform differential control disclosed in FIG. 6 of France Patent No. 2,088,803 has been conventionally known.

According to this apparatus, a pressure chamber a pressure cylinder including a piston fixed to a steering rod of a steering unit of a vehicle communicates with a pressure chamber of a working cylinder including a piston coupled to a hydraulic control valve, and the working cylinder is operated by pressure generated in accordance with a change in volume which occurs in the pressure cylinder upon steering of the vehicle, thus controlling the opening degree of the valve. Since an orifice is formed in the piston of the working cylinder, an operation of the working cylinder is changed in accordance with a rate of change in pressure, i.e., a steering rate of a steering wheel.

In the above-mentioned conventional apparatus, however, the working cylinder is coupled to the hydraulic control valve through a wire to drive the valve. Therefore, in order to achieve an excellent operation, a mounting position and a mounting angle of the valve and the working cylinder are largely restricted, and a degree of freedom of mounting and design of the apparatus is undesirably insufficient. In addition, two pressure chambers of the pressure cylinder serving as a source for generating pilot pressure communicate with each other through the orifice. Therefore, when pressure output from another hydraulic control apparatus serving as a source for generating pilot pressure is used, the pressure output from another hydraulic control apparatus leaks from the orifice. In practice, in this conventional apparatus, pressure output from another hydraulic control apparatus cannot be used as pilot pressure, but an exclusive pilot pressure generating means must be provided.

SUMMARY OF THE INVENTION

The present invention has been made in consideration of the above situations, and has as its object to provide a control valve which can be designed to have a high degree of freedom, and can perform differential control without adversely affecting another hydraulic apparatus even when the latter hydraulic apparatus is used as a pilot pressure source.

In order to achieve the above object, according to the present invention, there is provided a control valve comprising a piston, slidably arranged in a cylinder, for dividing the interior of the cylinder into a pressure-receiving chamber and a pair of output pressure chambers, throttle means for causing the pair of output pressure chambers to communicate with each other, and main valve means having a valve main body movable in accordance with pressure difference between the pair of output pressure chambers, the piston being slidable in accordance with pilot pressure applied to the pressure-receiving chamber to increase the volume of one of the output pressure chambers and to decrease the volume of the other one, and the valve main body of the main valve means being located between input and output ports of the main valve means to control hydraulic pressure being output from the output port, in accordance with the displacement position thereof.

According to the present invention, the piston is displaced in accordance with pilot pressure applied to the pressure-receiving chamber in the cylinder to increase the volume of one of the output pressure chambers and to reduce the volume of the other one. Therefore, pressure difference occurs between both the output pressure chambers, and the valve main body of the main valve means is operated in accordance with the pressure difference. Since the pair of output pressure chambers communicate with each other through the throttle means, the pressure difference varies in correspondence with a rate of a change in volumes of the output pressure chambers, i.e., a rate of change in pilot pressure, thus controlling the main valve means. More specifically, the main valve means is driven under the differential control with respect to the pilot pressure. In addition, since the main valve means is driven by the pressure difference between the pair of output pressure chambers, the mounting positions of the main valve means and the piston can be relatively freely determined. The pressure-receiving chamber is separated from the pair of output pressure chambers by the piston, and the throttle means is arranged between the output pressure chambers. Therefore, even if pressure output from another hydraulic control apparatus is applied to the pressure-receiving chamber as pilot pressure, another hydraulic control apparatus does not communicate with the throttle means, thus preventing an adverse effect to another hydraulic control apparatus.

Thus, according to the present invention, there is provided a control valve with a relatively simple arrangement which can be designed to have a high degree of freedom, and does not adversely affect another hydraulic control apparatus even if the pressure output from the latter hydraulic control apparatus is used as pilot pressure.

According to a preferred aspect of the present invention, the throttle means is constituted by a variable throttle unit whose throttle amount is variable in accordance with the displacement of a movable member slidably arranged in a casing, and the displacement of the movable member is controlled by the hydraulic pressure applied to the pressure chamber adjacent to the movable member. Thus, differential control according to the pilot pressure and proportional control according to the hydraulic pressure applied to the pressure chamber can be simultaneously achieved.

According to another preferred aspect of the present invention, the displacement direction of the valve main body of the main valve means is parallel to that of the piston, and the piston, the throttle unit, and the main valve means are arranged in a common valve case, whereby the size of the apparatus can be effectively decreased.

According to still another preferred aspect of the present invention, the pressure-receiving chamber includes first and second pressure-receiving chambers separated from each other by the piston, and the displacement direction of the piston by the pilot pressure applied to the first pressure-receiving chamber is opposite to that of the piston by the pilot pressure applied to the second pressure-receiving chamber. Therefore, the displacement of the piston can be controlled by pressure difference between the pilot pressures respectively applied to the pressure-receiving chambers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 11 show a four-wheel steering system including a control valve according to an embodiment of the present invention, in which:

FIG. 1 is a view showing a schematic arrangement of the entire system;

FIG. 2 is a sectional view showing a main part of the control valve;

FIG. 3 is a sectional view taken along a line III—III of FIG. 2;

FIG. 4 is a side view of the control valve viewed from a direction indicated by an arrow IV in FIG. 2;

FIG. 5 is a sectional view taken along a line V—V of FIG. 4;

FIG. 6 is a sectional view taken along a line VI—VI of FIG. 2;

FIG. 7 is a plan view of the control valve viewed from a direction indicated by an arrow VII in FIG. 2;

FIG. 8 is a sectional view taken along a line VIII—VIII of FIGS. 4 and 7;

FIG. 9 is a graph showing the characteristics of a flow rate of an oil pump;

FIG. 10 is an enlarged view of a throttle portion; and

FIG. 11 is a graph showing the characteristics of the throttle portion shown in FIG. 10;

DETAILED DESCRIPTION OF THE PREFERRED EMBODIMENT

An embodiment of the present invention will be described in detail with reference to the accompanying drawings.

FIGS. 1 to 11 show an embodiment of the present invention, which is incorporated with a four-wheel steering system for controlling a steering angle of each of front and rear wheels of a vehicle by using hydraulic pressure.

Figure 1:
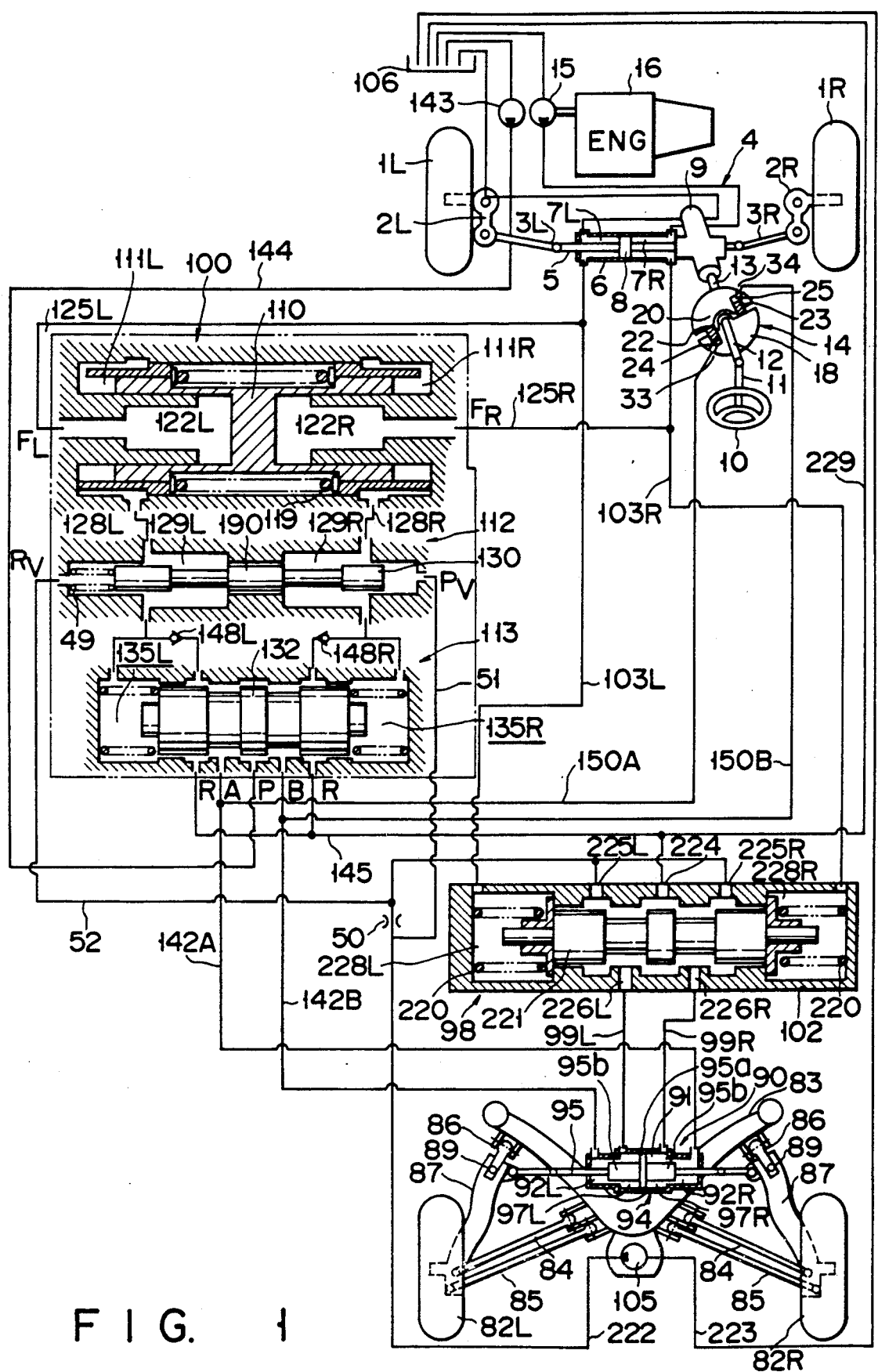

As shown in FIG. 1, left and right front wheels 1L and 1R of a vehicle are rotatably supported by knuckles 2L and 2R, respectively. The knuckles 2L and 2R are coupled to left and right ends of a piston rod 5 of a power steering unit 4 through tie rods 3L and 3R, respectively. The piston rod 5 is inserted through a cylinder 6, and includes a piston 8 partitioning the interior of the cylinder 6 into left and right pressure chambers 7L and 7R. The piston rod 5 also includes a rack meshed with a pinion (not shown) in a steering gear box 9. A gear ratio changing mechanism 14 is arranged between a first steering shaft 12 for receiving a steering input from a steering wheel 10 through a column shaft 11 and a second steering shaft 13 coupled to the steering gear box 9. For this reason, the steering input from the steering wheel 10 is transmitted to the steering gear box 9 through the mechanism 14. A known power steering valve is arranged between the second steering shaft 13 and the pinion gear in the steering gear box 9. This valve controls the supply of hydraulic pressure to the pressure chambers 7L and 7R. An oil pump 15 for supplying hydraulic pressure to the power steering unit 4 is driven by an engine 16. The pump 15 is of a type whose outlet flow rate decreases with an increase in the number of revolutions of the engine 16 after the number of revolutions of the engine reaches a predetermined value.

The gear ratio changing mechanism 14 will be described below. A first rotor 18 is fixed to the lower end of the first steering shaft 12, and a second rotor 20 is fixed to the upper end of the second steering shaft 13. A first plunger 22 provided at one side surface of the first rotor 18. The plunger 22 is actuated by hydraulic pressure to abut against the opposite side surface of the second rotor 20. A second plunger 23 is provided at one side surface of the second rotor 20 and actuated by hydraulic pressure to abut against the opposite side surface of the first rotor 18. A hydraulic chamber 24 is defined in the first rotor 18 to control an extending amount of the first plunger 22. Similarly, a hydraulic chamber 25 is defined in the second rotor 20 to control the extending amount of the second plunger 23. When pressurized oil is supplied from a first port 33 to the hydraulic chamber 24, and the first plunger 22 extends, the second rotor 20 rotates clockwise in FIG. 1 relative to the first rotor 18. In contrast to this, when pressurized oil is supplied from a second port 34 to the hydraulic chamber 25, and the second plunger 23 extends, the second rotor 20 rotates counterclockwise in FIG. 1 relative to the first rotor 18.

A rear wheel steering system of the four-wheel steering system will be described. Left and right rear wheels 82L and 82R are rotatably supported by the rear ends of trailing arms 87 of a double wishbone type rear wheel suspension with a tow control mechanism, respectively. More specifically, the rear wheel suspension includes a cross member 83, a pair of upper and lower lateral arms constituted by upper and lower arms 84 and 85 mounted on the cross member 83, and tow control arms 86 mounted on the cross member 83. Each tow control arm 86 is coupled to the front end of the corresponding trailing arm 87 through an intermediate joint. Each of the lateral arms 84 and 85 is coupled to the rear end of of the corresponding the trailing arm 87 through a ball joint. Each intermediate joint includes an axial support shaft 89 such as a pin with an axis of rotation extending in the vertical direction. For this reason, the rear wheels 82L and 82R can be turned by the displacement of the intermediate joint in the widthwise direction of the vehicle.

The front ends of the trailing arms 87 are respectively coupled to the left and right output ends of a piston rod 95 in a rear power cylinder 90 through the left and right tie rods. The cylinder 90 is fixed to the cross member 83. The cylinder 90 is of a twin type, and includes a cylinder 94 and the piston rod 95 which is slidable in the cylinder 94. The cylinder 94 includes a large-diameter cylinder chamber 91 and small-diameter cylinder chambers 92R and 92L respectively formed on the right and left sides of the cylinder chamber 91. The piston rod 95 includes a piston portion 95a having a diameter corresponding to the cylinder chamber 91 in the center thereof, and includes piston portions 95b respectively having diameters corresponding to the cylinder chambers 92L and 92R on the right and left sides of the piston portion 95a. The interior of the cylinder chamber 91 is separated into left and right pressure chambers 97L and 97R for receiving hydraulic pressure for in-phase steering. Hydraulic pressure for anti-phase steering acts on the cylinder chambers 92L and 92R. The rear wheels 82L and 82R are turned to the left or right in accordance with the displacement of the piston rod 95 in the widthwise direction of the vehicle. The left and right pressure chambers 97L and 97R are connected to an in-phase steering control valve 98 through oil paths 99L and 99R, respectively. The cylinder chambers 92R and 92L are connected to an auxiliary steering control valve 100 through oil paths 142A and 142B, respectively.

The control valve 98 is constituted by a throttle control type spool valve, and includes a cylindrical case 102 and a spool 221 disposed in the case. The spool 221 has left and right ends respectively biased by a pair of left and right springs 220, and is kept at a neutral position. The spool 221 also includes three land portions. The case 102 includes two inlet ports 225L and 225R for receiving pressurized oil, a return port 224, formed between the inlet ports 225L and 225R, for delivering the pressurized oil, and left and right output ports 226L and 226R respectively formed between the inlet ports 225L and 225R, and the return port 224. The three land portions change communication and restriction amounts between the adjacent ports in accordance with the displacement of the spool 221. Therefore, pressure difference between the left and right output ports 226L and 226R is controlled. Left and right pilot pressure chambers 228L and 228R are defined on the left and right sides of the spool 221 in the case 102. Pilot pressure is applied to the pilot pressure chambers 228L and 228R to control the displacement of the spool 221. The pilot pressure chambers 228L and 228R respectively communicate with the left and right pressure chambers 7L and 7R in the power steering unit 4 through pilot oil paths 103L and 103R. The two inlet ports 225L and 225R communicate with an outlet port of an oil pump 105 through an oil path 222. The oil pump 105 is driven by a ring gear in a differential unit for driving the rear wheels. The oil pump 105 receives oil from a reservoir tank 106 through an oil path 223, and delivers an amount of oil corresponding to the speed of the vehicle. A relief valve (not shown) is provided at the outlet port of the oil pump 105 to keep the flow rate constant when the speed of the vehicle exceeds a predetermined value within a relatively high-speed range. The return port 224 is connected to the reservoir tank 106 through an oil path 229. The left and right output ports 226L and 226R are connected to the left and right pressure chambers 97L and 97R of the rear power cylinder 90 through the oil paths 99L and 99R, respectively.

In the in-phase steering control valve 98 with the above mentioned arrangement, the displacement (throttle amount) of the spool 221 is controlled by hydraulic pressure generated from the power steering unit 4, and an amount of oil flowing into the valve 98 is controlled in accordance with the speed of the vehicle. For this reason, the higher the hydraulic pressure generated from the power steering unit 4 is (the larger the steering force is), or the higher the vehicle speed is, the higher the pressure difference between the left and right output ports 226L and 226R (between the pressure chambers 97L and 97R) is. The output in the in-phase steering direction generated from the rear power cylinder 90 is increased in accordance with this pressure difference.

As shown in FIG. 1, the auxiliary steering control valve 100 includes a piston 110 to be actuated by receiving pressure output from the power steering unit 4, a throttle control valve 112 for controlling a communication and throttle amount between a pair of output pressure chambers 111L and 111R whose volumes vary in accordance with the displacement of the piston 110, and a main valve 113 to be actuated by receiving hydraulic pressure generated from the output pressure chambers 111L and 111R as pilot pressure.

Figure 2:
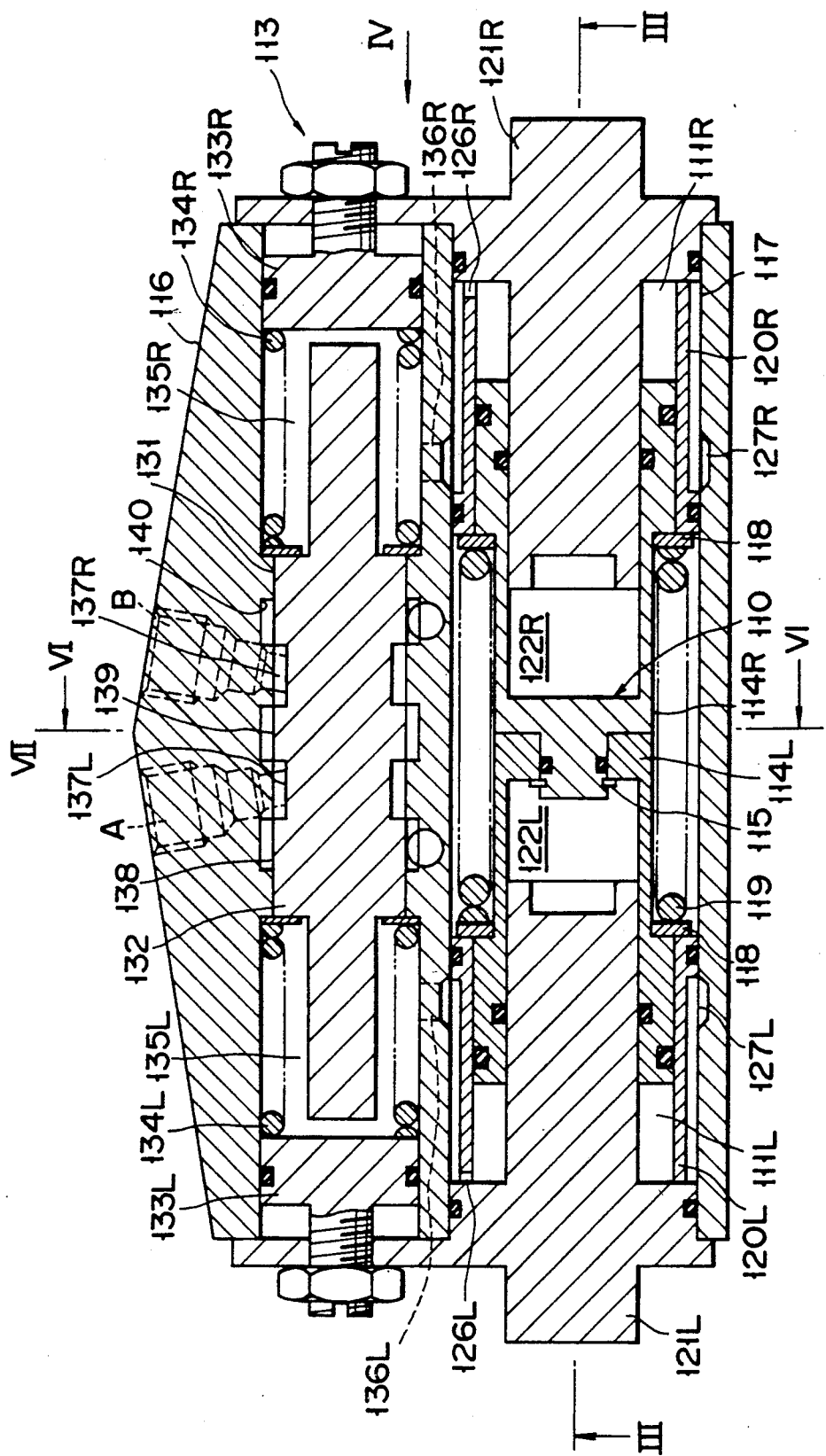
Figure 3:
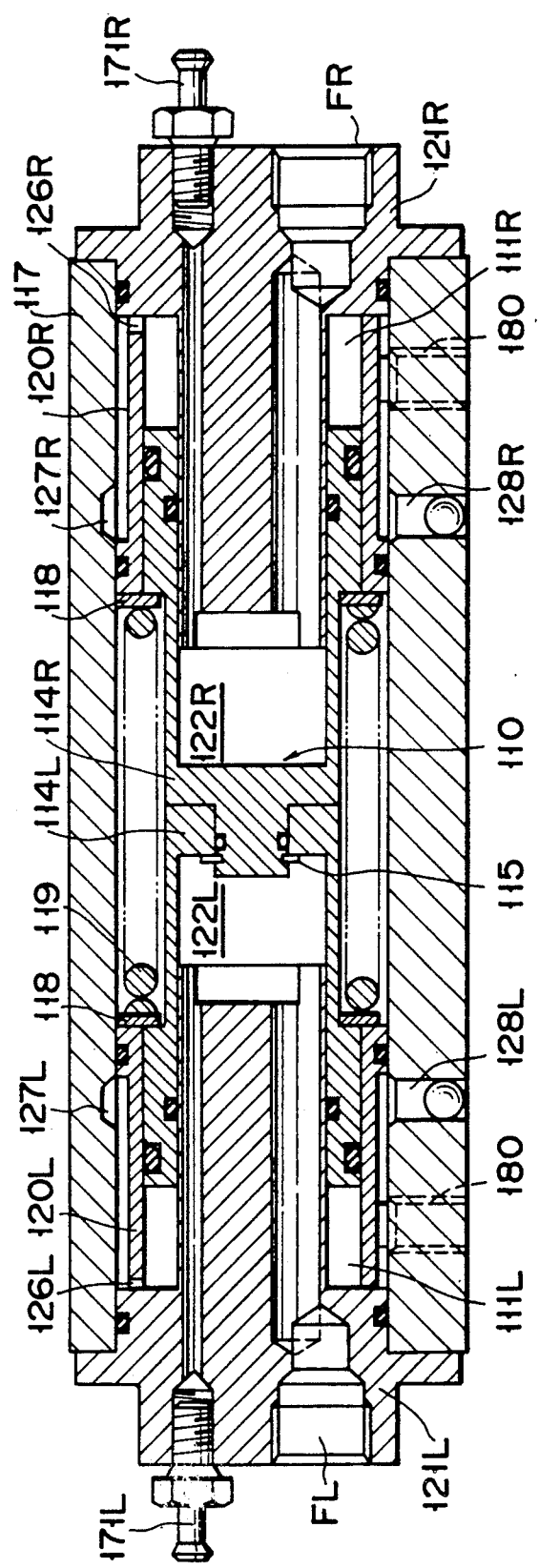
Figure 4:
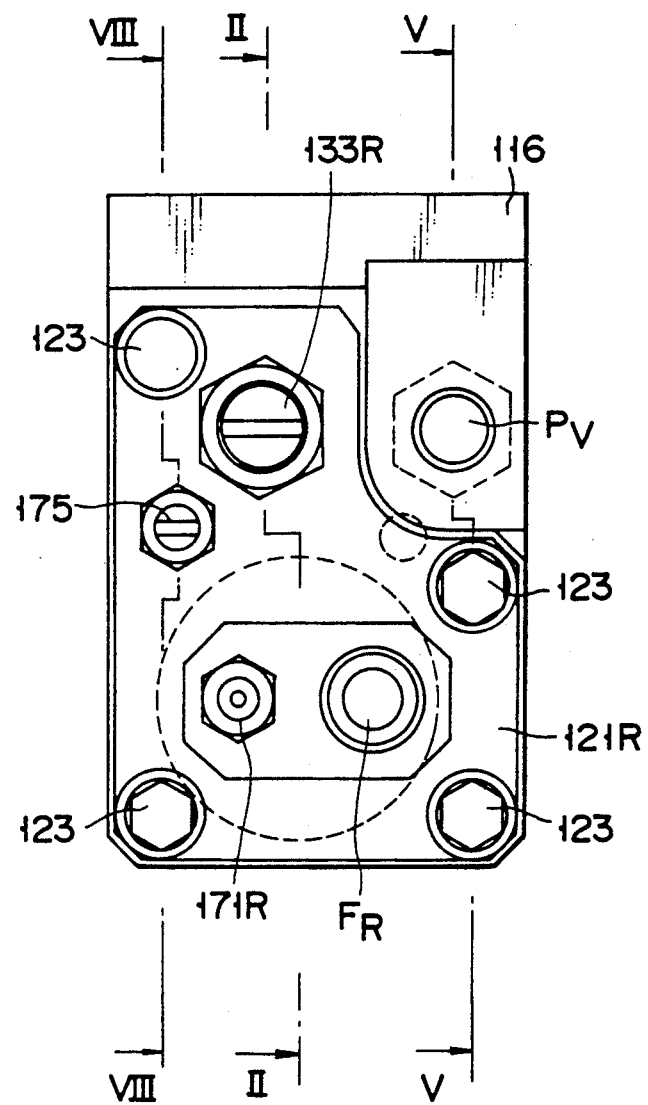

A detailed arrangement of the control valve 100 is shown in FIGS. 2 to 8. As shown in FIGS. 2 and 3, the piston 110 is constituted by coupling left and right cup-like piston members 114L and 114R to each other such that their bottom portions are in contact with each other. The piston 110 is inserted in a cylinder portion 117 in a valve case 116. For this reason, the piston 110 has a small-diameter central portion and large-diameter stepped end portions. A neutral spring 119 is incorporated between the left and right end portions through a pair of collars 118 upon coupling of the left and right piston members 114L and 114R. A pair of left and right cylindrical adapters 120L and 120R are arranged between the outer surfaces of the left and right ends of the piston 110 and the inner surfaces of the left and right ends of the cylinder portion 117, integrally with the valve case 116. The piston 110 is arranged to be slidable with respect to the adapters 120L and 120R. In addition, a pair of left and right plugs 121L and 121R are fixed to the valve case 116 via bolts 123 from the outer end sides to prevent the removal of the adapters 120L and 120R from the case 116. In this state, the adapters 120L and 120R abut against the collars 118, respectively. The inner end portions of the plugs 121L and 121R are inserted inside the piston 110, and the piston 110 is slidable with respect to the plugs 121L and 121R. The plugs 121L and 121R cooperate with the piston 110 to define left and right pressure-receiving chambers 122L and 122R in the valve case 116. The plugs 121L and 121R also cooperate with the left and right ends of the piston 11 and the inner surfaces of the adapters 120L and 120R to define the left and right output pressure chambers 111L and 111R. In addition, as shown in FIG. 3, left and right input ports FL and FR, which respectively communicate with the pressure-receiving chambers 122L and 122R, are formed in the plugs 121L and 121R. As shown in FIG. 1, these input ports FL and FR are connected to the left and right pressure chambers 7L and 7R in the power steering unit through oil paths 125L and 125R, respectively. For this reason the piston 110 displaces in accordance with pilot pressure introduced to the pressure-receiving chambers 122L and 122R. With this displacement, the volumes of the output pressure chambers 111L and 111R are increased and decreased, respectively, and vice versa. Note that air breathers 171L and 171R which can communicate with the pressure-receiving chambers 122L and 122R are provided in the plugs 121L and 121R, respectively, and air breathers 172L and 172R which can respectively communicate with the output pressure chambers 111L and 111R are provided in the valve case 116. Reference numeral 180 in FIG. 3 denotes a threaded hole for fixing the valve case 116 to a mounting bracket.

The output pressure chambers 111L and 111R respectively communicate with left and right oil chambers 129 and 129R formed in the throttle control valve 112 through notched portions 126L and 126R respectively formed in the outer ends of the adapters 120L and 120R, annular grooves 127L and 127R formed in the inner surface of the cylinder portion 117, and oil paths 128L and 128R formed in the valve case 116. The throttle control valve 112 controls a throttle amount between the left and right oil chambers 129L and 129R thereby to control the throttle amount of the output pressure chambers 111L and 111R. More specifically, the control valve 112 is actuated by hydraulic pressure applied from the oil pump 105 which is driven by the differential unit and increases its flow rate with an increase in vehicle speed. Thus, the throttle amount of the control valve 112 varies in accordance with the vehicle speed.

Figure 5:
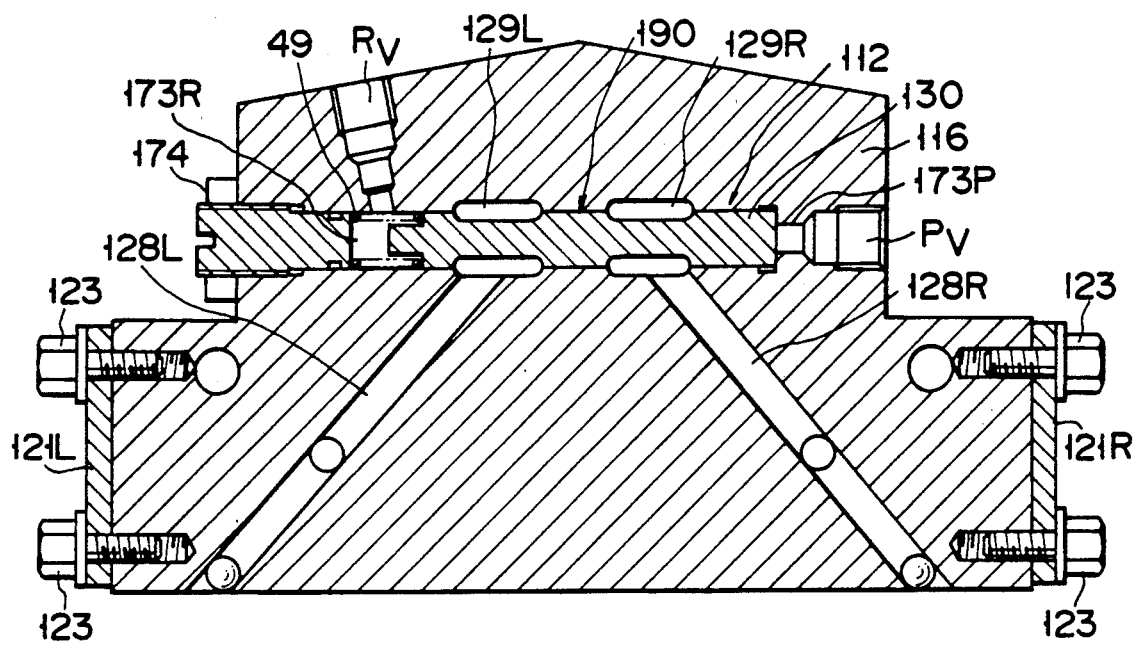
Figure 6:
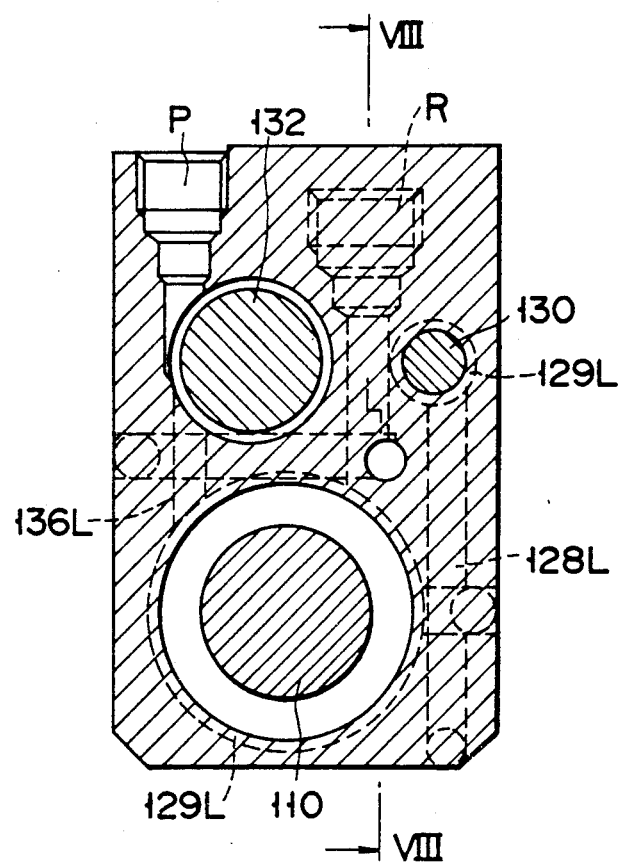

As shown in FIG. 5, the throttle control valve 112 controls an overlapping amount of a throttle portion 190 defined by the outer surface of a vehicle speed sensitive spool 130 and the inner surface of the valve case 116 between the oil chambers 129L and 129R, thus controlling a throttle amount between the oil chambers 129L and 129R. More specifically, oil chambers 173P and 173R are defined on the right and left sides of the vehicle speed sensitive spool 130 which is biased to the right in FIGS. 1 and 5 by a spring 49 and is slidably disposed. A throttle 50 is provided in the oil path 222 extending from the oil pump 105. Pressures $V_P$ and $V_R$ in the oil path 222 on the upstream and downstream of the throttle 50 are applied to ports $P_V$ and $R_V$ formed in the valve case 116 and communicating with the oil chambers 173P and 173R, through oil paths 51 and 52, respectively. Thus, the spool 130 is actuated by pressure difference between the upstream pressure $V_P$ and the downstream pressure $V_R$. The spool 130 displaces against the biasing force of the spring 49 in accordance with the pressure difference ($V_P - V_R$) which increases with an increase in vehicle speed. The length of the throttle portion 190 is, therefore, decreased with an increase in vehicle speed, and the throttle amount of the valve 112 decreases. With the control valve 112, by adjusting a screw amount of a plug 174 which defines the oil chamber 173R, the preload of the spring 49 can be controlled. Therefore, the vehicle speed sensitive characteristics of the spool 130 can be controlled.

The main valve 113 serves as a spool valve type four-port throttle switching valve. More specifically, as shown in FIGS. 1 and 2, the valve 113 includes a cylinder portion 131 formed in the valve case 116 and a main spool 132 serving as a valve main body having three land portions. The main spool 132 is disposed in the cylinder portion 131 to be slidable in the axial direction. The left and right ends of the cylinder portion 131 are sealed with plugs 133L and 133R threadably engaged with the plugs 121L and 121R, respectively. A pair of springs 134L and 134R are respectively arranged between these plugs 133L and 133R and the left and right ends of the main spool 132 to bias the main spool 132 to a neutral position. By adjusting the depths of the threadable engagement of the plugs 133L and 133R, the preload of the springs 134L and 134R acting on the main spool 132 can be controlled, respectively. These springs 134L and 134R are contained in left and right pilot pressure supply chambers 135L and 135R defined by the left and right ends of the main spool 132, the left and right ends of the cylinder portion 131, and the plugs 133L and 133R. The pilot pressure supply chambers 135L and 135R communicate with the above-mentioned left and right output pressure chambers 111L and 111R through oil paths 136L and 136R formed in the valve case 116, respectively. In this case, as shown in FIG. 1, the pilot pressure supply chambers 135L and 135R may communicate with the output pressure chambers 111L and 111R through the oil chambers 129L and 129R of the restriction control valve 112, respectively.

Figure 7:
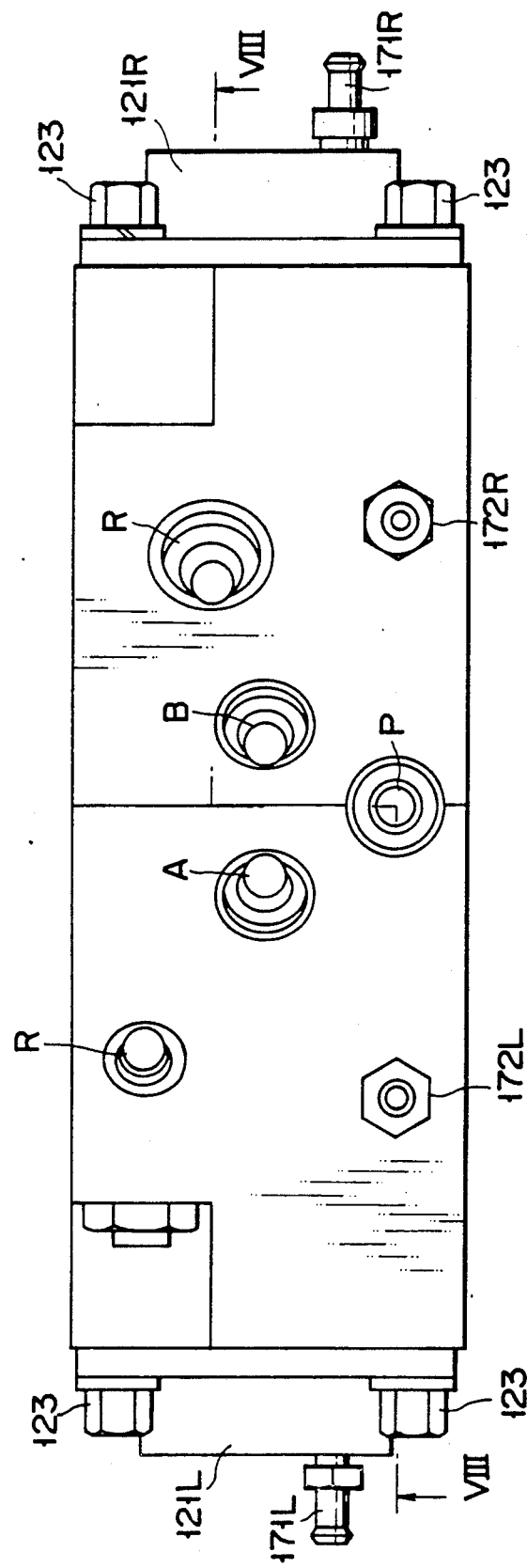

Two chambers 137L and 137R each constituted by an annular groove positioned between two adjacent land portions are arranged on the outer surface of the main spool 132. In addition, three chambers 138, 139, and 140 each constituted by an annular groove are formed on the inner surface of the cylinder portion 131, locating boundary portions of the chambers 137L and 137R. As shown in FIGS. 1, 2 and 7, the chambers 137L and 137R respectively communicate with left and right output ports A and B formed in the outer surface of the valve case 116 through oil paths formed in the valve case 116. These output ports A and B are connected to the cylinder chambers 92R and 92L of the rear power cylinder 90 through oil paths 142A and 142B, respectively. In addition, the chamber 139 communicates with an inlet port P. The inlet port P is connected through the oil path 144 to an outlet port of a constant flow rate type oil pump 143 driven by the engine 16 together with the above-mentioned oil pump 15. The oil pump 143 has outlet flow rate characteristics shown in FIG. 9, and supplies oil to the part P at a constant flow rate. The remaining chambers 138 and 140 communicate with a return port R formed in the outer surface of the case 116 through an oil path 146 (FIG. 8) formed in the valve case 116. The return port R is connected to the reservoir tank 106 through an oil path 145.

Figure 8:
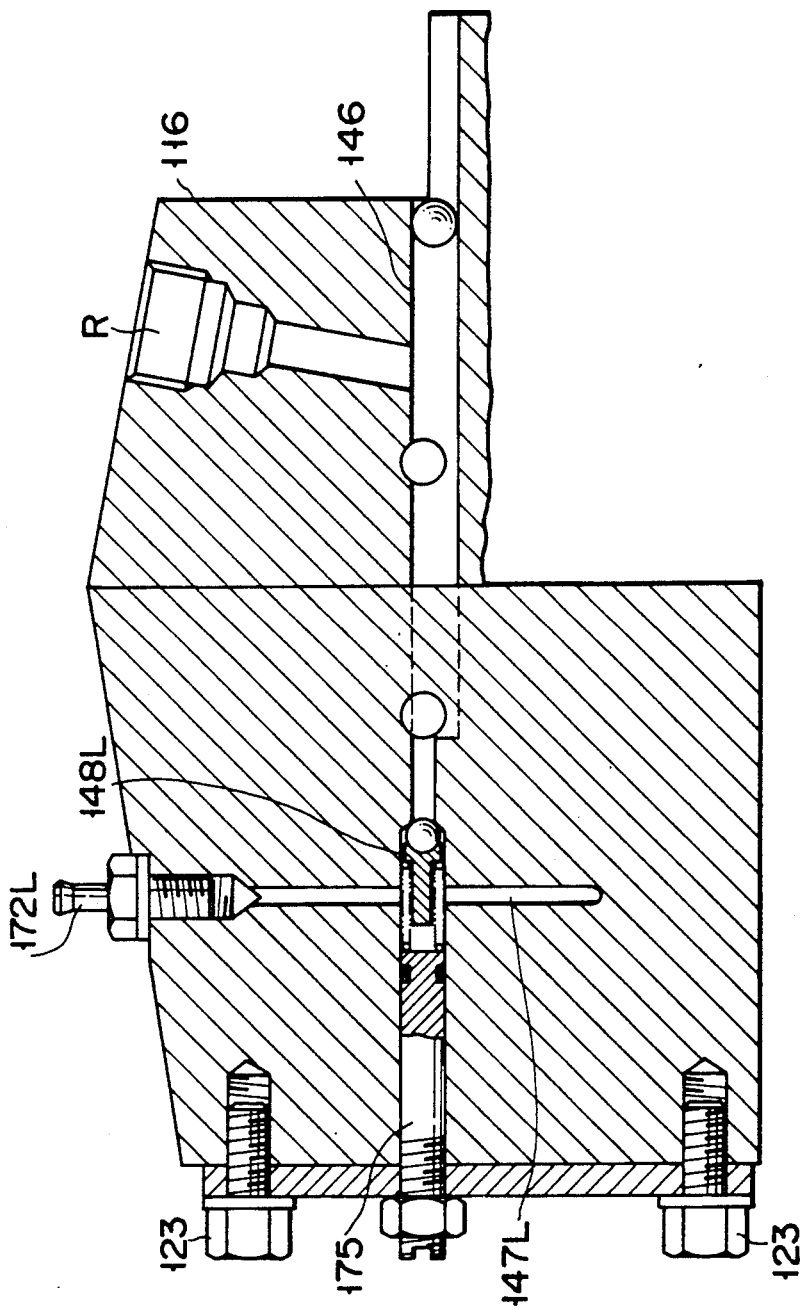
Figure 9:
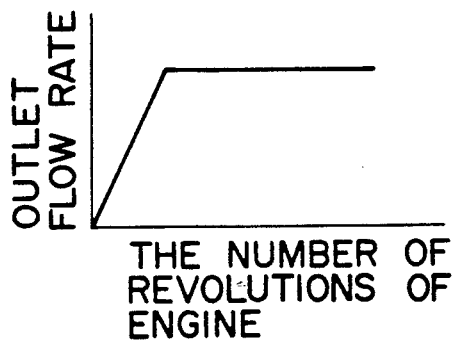

The oil path 146 formed in the valve case 116 is connected to oil paths 147L and 147R which respectively communicate with the left and right output pressure chambers 111L and 111R through check valves 148L and 148R. The check valves 148L and 148R constitute a safety unit. Specifically, the valves 148L and 148R are opened when the left and right output pressure chambers 111L and 111R are set in abnormal negative pressure, thereby supplying a required amount of working oil from the reservoir tank 106 to the output pressure chambers 111L and III R. As shown in FIG. 8, by adjusting a screw amount of a plug 175, an opening valve pressure of the check valve 148 can be controlled.

The operation of the control valve 100 with the above mentioned arrangement will be theoretically described exemplifying a case wherein high pilot pressure is applied to the port $F_L$. When high pilot pressure is applied to the port $F_L$, the piston 110 is displaced to the right in FIGS. 1 to 3 by an amount proportional to the applied pressure. If this displacement is defined as $x_1$, a product of a sectional area $A_1$ of an end face of the piston 110 and pressure difference $P_1$ between the ports $F_L$ and $F_R$ is equal to the urging force of the spring 119. Therefore, the following relationship can be obtained:

$$A_1 \cdot P_1 = K_1 \cdot x_1 + f_1$$

$$x_1 = (A_1 \cdot P_1 - f_1)/K_1 \ldots \quad (1)$$

where $K_l$: a spring constant of the spring 119
$f_l$: a preload value of the spring 119.

At this time, oil in the output pressure chamber 111R must be introduced into the output pressure chamber 111L, in accordance with the displacement of the piston 110. Since the throttle control valve 112 is located between the chambers 111R and 111L, however, pressure difference $\Delta P_l$ is generated between the chambers 111R and 111L. The pressure difference $\Delta P_l$ is defined as follows:

$$\Delta P_1 = 8\pi\mu \cdot Q_2/d^2 \ldots \quad (2)$$

where $Q_2$: a flow rate of oil flowing through the throttle portion
d : a sectional area of the throttle portion
l : a length of the throttle portion
$\mu$: a viscosity coefficient of oil The pressure difference $\Delta P_1$ displaces the main spool 132 of the main valve 113 to the left in FIGS. 1 to 3. If this displacement is defined as $Y_1$, the following relationship is obtained:

$$Y_1 = (\Delta P_1 \cdot D_2 = f_2)/K_2 \ldots \quad (3)$$

where $D_2$ : a sectional area of the end face of the main spool
$K_2$ : a spring constant of the spring 134
$f_2$ : a preload value of the spring 134

The four-port throttle switching valve is formed between the main spool 132 and the valve case 116, and pressure difference $\Delta P_2$ generated between the ports A and B is in proportion to the displacement $Y_1$ of the main spool 132.

The displacement $Y_1$ of the main spool 132 satisfies the relationship $Y_1 \propto \Delta P_1 \propto Q_2 \propto l'1/d^2$ in accordance with the above equations (2) and (3), and the following relationship is also defined:

$$Q_2 = B \cdot x_1/t \ldots \quad (4)$$

where B : a sectional area of the output pressure chamber
t : time

Since the relationship $x_1 = P_1$ is obtained from the above equation (1), oil pressure generated at the main valve 113 is in proportion to a time change rate $P_1/t$ of the pressure difference $\Delta P_1$ between the ports $F_L$ and $F_R$.

Since the oil pressure is also in proportion to the length l of the throttle portion 190 of the throttle control valve 112, the oil pressure generated at the main valve 113 can be controlled in response to another signal input (pilot pressure proportional to a vehicle speed, i.e., pressure difference between the ports $P_V$ and $R_V$).

In this manner, in the control valve 100 controls pressure difference generated between the ports A and B, in response to two types of signal inputs (pilot pressure).

Figure 10:
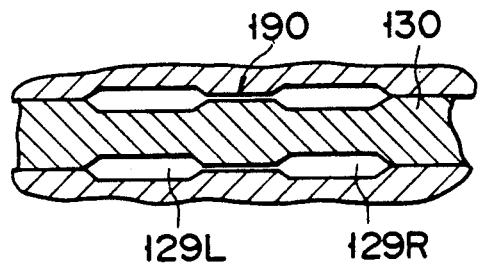
Figure 11:
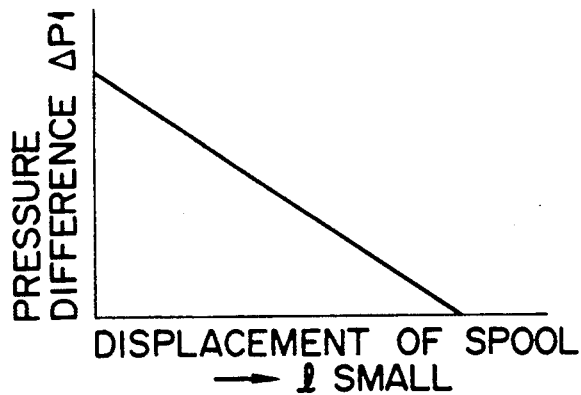
Figure 12:
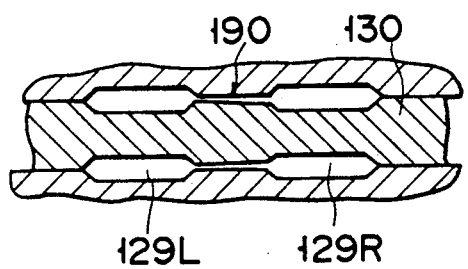
FIGS. 12 and 13 are respectively a sectional view and a perspective view showing a modification of the throttle portion.
Figure 13:
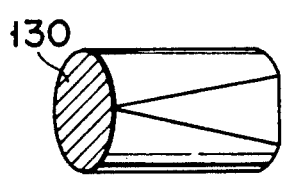
Figure 14:
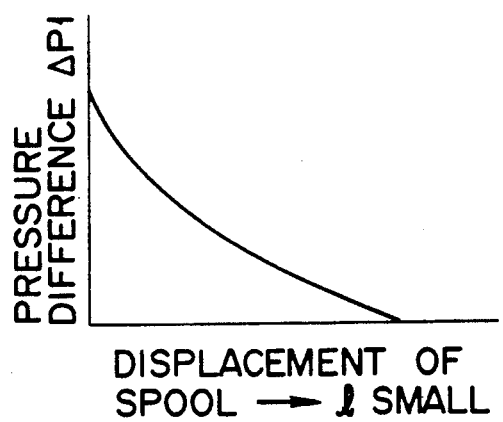
FIG. 14 is a graph showing the characteristics of the throttle portion shown in FIGS. 12 and 13.

As is apparent from the above description, the hydraulic pressure generated at the main valve 113 is inversely proportional to the sectional area d of the throttle portion 190. As shown in FIG. 10, therefore, when the throttle portion 190 is formed in parallel so that the sectional area of the throttle portion 190 is not changed upon the movement of the vehicle speed sensitive spool 130, the characteristics (vehicle speed sensitive characteristics) shown in FIG. 11 can be obtained. As shown in FIG. 12 and 13, when a vehicle speed sensitive spool 130 defining a tapered throttle portion 190 is used so that the sectional area of the portion 190 increases upon the movement of the spool 130, the characteristics (vehicle speed sensitive characteristics) shown in FIG. 14 can be obtained. In this manner, by changing the shape of the throttle portion, arbitrary vehicle speed characteristics can be obtained.

Note that, when a throttle control valve with an orifice structure is used, the following relationship is obtained:

$$\Delta P = \rho Q b/(2C d^2 \cdot d^2)$$

where $\rho$: density of fluid
Cd: a coefficient of flow rate

When the hydraulic pressure in the port $F_R$ is decreased after an increase, or when pilot pressure acts on the port $F_R$ (a pressure increase), the control valve 100 is actuated in a direction opposite to the above mentioned direction, and pressure difference generated between the ports A and B is also reversed.

The operation of the control valve 100 will be briefly described again. The piston 110 displaces in correspondence with the hydraulic pressure generated supplied from the power steering unit 4 to the pressure-receiving chambers 122L and 122R as pilot pressure, thereby causing a change in volume between the output pressure chambers 111L and 111R. Since the output pressure chambers 111L and 111R communicate with each other through the throttle control valve 112, large pressure difference is generated between the chambers 111L and 111R if the displacement rate of the piston 110 is high. If the displacement rate of the piston 110 is low, however, pressure difference generated between the output pressure chambers 111L and 111R is low. Thus, hydraulic pressure corresponding to the displacement rate of the piston 110 is applied to the pilot pressure supply chambers 135L and 135R of the main valve 113 as pressure difference. The main spool 132 is displaced in accordance with this pressure difference, and hydraulic pressures corresponding to the displacement of the main spool 132 are output from the output ports A and B. More specifically, hydraulic pressure output from the control valve 100 increases as the relative displacement of the main spool 132 is larger and as the rate of change in hydraulic pressure generated from the power steering unit 4, which affects the displacement rate of the piston 110, is larger. In addition, the throttle amount (the length of the throttle portion 190 of the throttle control valve 121, serving as a displacement resistance for the piston 110, is decreased with an increase in vehicle speed. Therefore, the lower the vehicle speed is, the larger the hydraulic pressure output from the valve 100 is. The hydraulic pressure output from the control valve 100 is applied to the cylinder chambers 92R and 92L of the rear power cylinder 90, and functions as power to turn the rear wheels in the anti-phase direction with respect to the front wheels. Note that the throttle control valve 112 functions as a differential element. Therefore, when a change in the hydraulic pressure from the power steering unit 4 as in the case where the steering angle is kept constant, even if the front wheels are turned, the piston 110 is returned to the neutral position by the spring 119. Thus, the main spool 132 of the control valve 112 also returns to the neutral position, and hydraulic pressure is not generated. Accordingly, the hydraulic pressure output from the control valve 100 is controlled approximately in accordance with a turning speed of the steering wheel.

An operating direction and operating amount of the rear power cylinder 90 are controlled by a composite force of an in-phase steering force applied from the in-phase steering control valve 90 to the pressure chambers 97L and 97R, and an anti-phase steering force applied from the auxiliary steering control valve 100 to the cylinder chambers 92R and 92L. In other words, the rear wheels are turned in accordance with the composite value of the two input forces acting in opposite directions.

The first and second ports 33 and 34 of the above-mentioned gear ratio changing mechanism 14 communicate through oil paths 140A and 150B with the intermediate portions of the oil paths 142A and 142B connected to the output ports A and B of the control valve 100, respectively. Hydraulic pressure output from the control valve 100 also acts on the gear ratio changing mechanism 14 in a direction to additionally increase a steering angle of the front wheels. Thus, the control valve 100 integrally controls the anti-phase steering of the rear wheels and the advanced phase steering (additional steering operation) of the front wheels.

The operation of the entire four-wheel steering system with the above arrangement will be described.

When the steering wheel 10 is turned to the right in a straight traveling state, hydraulic pressure output from the power steering valve acts on the pressure chamber 7R on the right side of the cylinder 6 in the power steering unit 4 to power-assist the right turn of the front wheels. In this state, the pressure chamber 7R on the right side of the cylinder 6 is set in a high-pressure state, and the pressure chamber 7L on the left side is set in a low-pressure state. The pressures in these pressure chambers 7L and 7R are applied to the in-phase steering control valve 98 and the auxiliary steering control valve 100 as pilot pressures through the oil paths 103L and 103R, and 125L and 125R, respectively.

In the control valve 98, pressure in the pilot pressure chamber 228R is high, and pressure in the pilot pressure chamber 228L is low. The spool 221 is displaced to the left in FIG. 1 in accordance with the hydraulic pressure generated from the power steering unit 4. Thus, high and low hydraulic pressures are respectively generated at the output ports 226L and 226R in accordance with the displacement of the spool 221 and the oil amount supplied from the oil pump 105. The hydraulic pressures act on the left and right pressure chambers 97L and 97R of the rear power cylinder 90 through the oil paths 99L and 99R, respectively. Therefore, the piston rod 95 of the rear power cylinder 90 receives from the left side pressure chamber 97L with the hydraulic pressure for turning the rear wheels to the right (in-phase direction). This hydraulic pressure corresponds to the hydraulic pressure generated by the power steering unit 4, and the vehicle speed.

Figure 15:
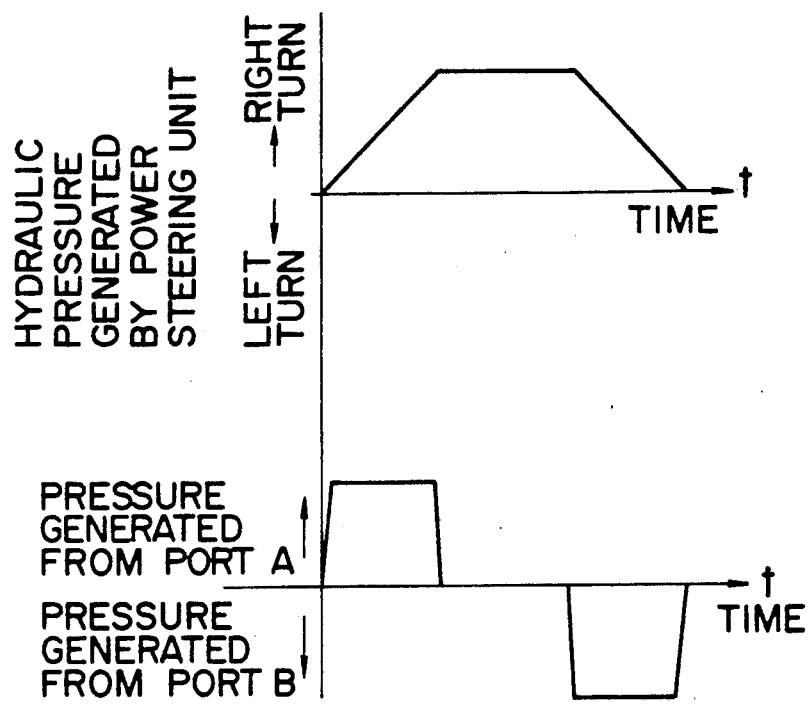
FIG. 15 is a graph showing a relationship between pilot pressure and output hydraulic pressure in the control valve.

In the control valve 100, the pressures in the pressure-receiving chambers 122R and 122L become high and low in accordance with hydraulic pressure applied from the power steering unit 4 to the ports $F_L$ and $F_R$ through the oil paths 125L and 125R. On the contrary to the state in the above description of the valve 10 itself, the piston 110 is displaced to the left in FIG. 1 in accordance with the hydraulic pressure generated from the power steering unit 4. The displacement rate of the piston 110 corresponds to the changing rate of the hydraulic pressure generated from the power steering unit 4. However, the output pressure chambers 111L and 111R communicate with each other through the throttle control valve 112. The throttle control valve 112 serves as a resistance with a change in volumes of the output pressure chambers 111L and 111R. Therefore, a pressure change which occurs in accordance with the change in volumes of the output chambers 111L and 111R is larger as the displacement rate of the piston 110 is higher (a rate of change in hydraulic pressure generated by the power steering unit is larger), or the throttle amount is larger (the length of the throttle portion 190 is larger, i.e., a vehicle speed is lower). The main spool 132 of the main valve 113 is displaced in accordance with the pressure difference between the output pressure chambers 111L and 111R which occurs due to the change in pressure. Since the oil amount supplied from the oil pump 143 is constant, the main valve 113 generates hydraulic pressure corresponding to only the displacement of the main spool 132, and pressures at the output ports A and B are respectively set to be high and low. The hydraulic pressures act on the cylinder chambers 92R and 92L of the rear power cylinder 90 through the oil paths 142A and 142B, respectively. Therefore, the piston rod 25 of the rear power cylinder 90 receives from the cylinder chamber 92R on the right side with the hydraulic pressure for turning the rear wheels to the left (anti-phase direction). The lower the vehicle speed is, or the larger the rate of change in hydraulic pressure generated from the power steering unit is, the higher the oil pressure for turning the rear wheels in anti-phase direction is. Note that a relationship between the input pilot pressure and the oil pressure generated by the control valve 100 is shown in FIG. 15.

Figure 16:
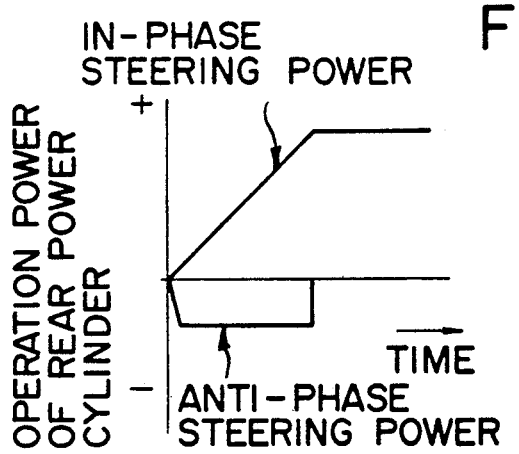
FIG. 16 is a graph for explaining the characteristics of in-phase and anti-phase steering forces applied to a rear power cylinder.
Figure 17:
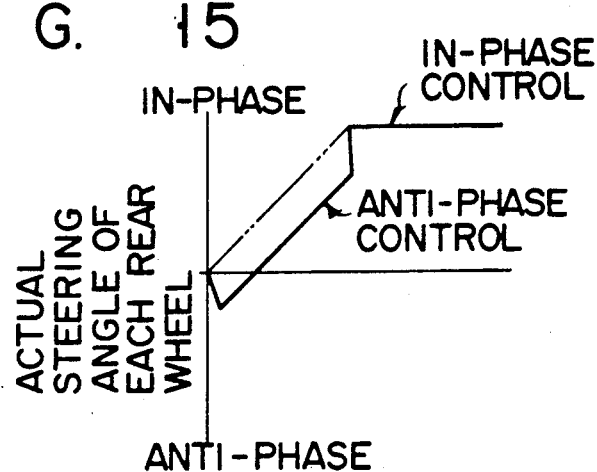
FIG. 17 is a graph showing the characteristics of a steering angle of rear wheels.

In the rear power cylinder 90, the hydraulic pressure which acts on the pressure chamber 97L to turn the rear wheels to the right (in-phase direction), and the hydraulic pressure which acts on the cylinder chamber 92R to turn the rear wheels to the left (anti-phase direction) are applied on the piston rod 95 in opposite directions. Thus, the operation of the piston rod 95 is controlled by the composite power of both the hydraulic pressure. More specifically, FIG. 16 shows a relationship between an in-phase steering force generated in correspondence with the oil pressure generated by the power steering unit, and an anti-phase steering force generated in correspondence with a rate of change in oil pressure generated by the power steering unit. When both the steering forces are synthesized with each other, a steering angle of each rear wheel with the characteristics shown in FIG. 17 is obtained.

When the hydraulic pressure generated by the power steering unit increases as in the case where the steering wheel is turned from its neutral state, the steering angle of the rear wheels in the in-phase direction, which tends to increase in response to the increase in the hydraulic pressure generated by the power steering unit, is decreased in accordance with the rate of change in the hydraulic pressure generated from the power steering unit. Substantially, the rear wheels are temporally turned in the anti-phase direction at the start of turning the front wheels, and then turned in the in-phase direction. The higher the vehicle speed is, the larger the in-phase steering force is, and the lower the anti-phase steering force is. A steering angle in the anti-phase direction at the start of the steering operation is decreased as the vehicle speed is increased, and a steering angle in the in-phase direction is increased. In contrast to this, when the vehicle speed is low, the in-phase steering force is decreased and the anti-phase steering force is increased. Therefore, a steering angle in the anti-phase direction at the start of the steering operation is increased, and a steering angle in the in-phase direction is decreased.

When the hydraulic pressure generated from the power steering unit does not vary, the valve 100 does not generate any hydraulic pressure. Therefore, the rear wheels are turned in the in-phase direction by an angle according to the hydraulic pressure generated from the power steering unit.

When the hydraulic pressure generated from the power steering unit is decreased as in such a case where the steering wheel is returned to its neutral position from a turned state, the hydraulic pressure outputs from the control valve 100 are reversed. Therefore, the steering angle of the rear wheels in the in-phase direction, which decreases in response to the decrease in the hydraulic pressure generated from the power steering unit, is increased in accordance with the rate of change in the hydraulic pressure generated from the power steering unit.

Figure 18:
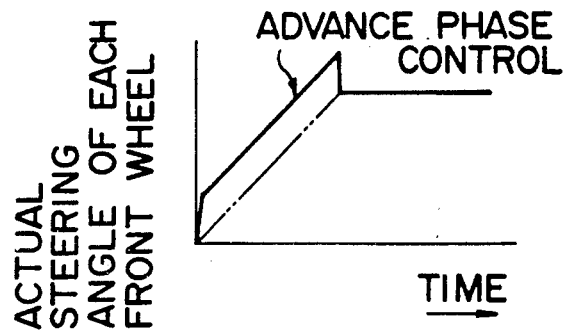
FIG. 18 is a graph showing the characteristics of a steering angle of front wheels.

The hydraulic pressure output from the control valve 100 acts on the rear power cylinder 90, as described above, so as to correct the steering angle of the rear wheels in the anti-phase direction. In addition, this hydraulic pressure acts on the gear ratio changing mechanism 14 through the oil paths 150A and 150B. High hydraulic pressure generated at the output port A of the control valve 100 upon right turning of the steering wheel 10 is introduced to the first port 33 through the oil path 150A, and is applied to the pressure chamber 24 of the first rotor 18. The pressure chamber 25 of the second rotor 20 communicates with the output port B of the control valve 100 through the oil path 150B, thereby being a low-pressure state. The first plunger 22 is extended by the hydraulic pressure supplied to the pressure chamber 24, and a relative displacement occurs between the first and second rotors 18 and 20. The second plunger 23 is pulled into the pressure chamber 25 set in a low-pressure state. In this state, the second steering shaft 13 is further rotated clockwise with respect to the first steering shaft 12 being rotated clockwise in response to an input from the steering wheel, so that the second steering shaft 13 is rotated by an angle larger than the turning angle of the steering wheel 13. Therefore, an equivalent steering gear ratio is changed to achieve phase advance control for increasing the steering angle of the front wheels in correspondence with the rate of change in hydraulic pressure generated from the power steering unit. The control valve 100 generates hydraulic pressure only when the hydraulic pressure generated from the power steering unit is changed. As shown in FIG. 18, therefore, the above-described phase advance control is performed only when the steering wheel is turned, and is stopped when the steering wheel is kept at a certain angle. When the hydraulic pressure generated from the power steering unit decreases, as in such a case where the steering wheel is returned to the neutral position, the hydraulic pressures output from the control valve 100 are reversed. Therefore, the steering angle of the front wheels decreases in accordance with the rate of change in hydraulic pressure generated from the power steering unit.

According to the four-wheel steering system of the above embodiment, in-phase steering control for the rear wheels is performed in accordance with the hydraulic pressure generated from the power steering unit, which substantially corresponds to the steering force of the steering wheel. The anti-phase steering control of the rear wheels and phase advance control of the front wheels are performed in correspondence with the rate of change in hydraulic pressure generated from the power steering unit, which substantially corresponds to the turning speed of the steering wheel. Therefore, both a yaw response and a lateral acceleration response of the vehicle can be improved, thus effectively and simultaneously achieving excellent steering response and operational stability. In addition, a gravity slipping angle upon transit turn approaches "0", and turn feeling of the vehicle is effectively improved. Furthermore, since all operations of the above-mentioned four-wheel steering system are controlled using hydraulic pressures, high reliability and durability can be achieved.

In particular, according to the control valve 100 of the above embodiment, hydraulic pressure to be generated from the main valve 113 can be controlled in accordance with a rate of change in first pilot pressure (hydraulic pressure generated from the power steering unit) and second pilot pressure (hydraulic pressure corresponding to the vehicle speed). Therefore, when differential control and control of inverse proportion (or proportion control) are performed with respect to the two pilot pressures, complicated and high-degree oil pressure control can be effectively realized.

In the control valve 100, the piston 110 is displaced by the hydraulic pressure generated from the power steering unit, which is supplied as pilot pressure, and an operation of the main valve 113 is controlled by the hydraulic pressure generated in the output pressure chambers 111L and 111R, volumes of which vary in accordance with the displacement of the piston 110. Therefore, the pilot pressure can be obtained without adversely affecting the power steering unit 4, and a degree of freedom of design of the positional relationship between the piston 110 and the main valve 113 can be increased.

In addition, by changing the sectional areas of the pressure-receiving and output pressure chambers, the preload and a spring constant of each spring, or the shape of the throttle portion, various characteristics can be obtained. Since the piston portion, the throttle control portion, and the main valve portion are independently arranged, setting of each portion can be independently performed, thus effectively obtaining a good tuning property. Further, these portions are independently arranged, so that excellent workability and assembly can be achieved.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A control valve used in a hydraulic apparatus, comprising:

first valve means including a cylinder, and a piston arranged in said cylinder and defining in said cylinder a pair of pressure-receiving chambers for receiving pilot pressure and first and second output pressure chambers, said piston being capable of moving in accordance with the difference between the pilot pressure applied to said pressure-receiving chambers to increase the volume of the first output pressure chamber and to decrease the volume of the second output pressure chamber, and vice versa;

means for connecting said first and second output pressure chambers to each other; throttling means arranged in the connecting means, for throttling the connecting means; and main valve means including an input port receiving hydraulic pressure, an output port outputting hydraulic pressure, a pair of pressure chambers communicating with said first and second output pressure chambers of said first valve means, respectively, and a valve member arranged between said pressure chambers and between said input and output ports to be movable in accordance with the pressure difference between said first and second output pressure chambers, for controlling the hydraulic pressure output from said output port in accordance with the position of said valve member.

2. A control valve according to claim 1, wherein said throttle means includes variable throttle means having a throttle member arranged in said connected means to be displaceable, for changing a throttle amount of said connecting means in accordance with the displacement of said throttle member.

3. A control valve according to claim 2, wherein said variable throttle means includes pressure chambers, defined in said connecting means on both sides of said throttle member and receiving pilot pressure, and said throttle member is displaceable in accordance with the pilot pressure applied to said pressure chambers.

4. A control valve according to claim 1, wherein said piston of said first valve means and said valve member of said main valve means are arranged to be movable in directions parallel to each other, and which further comprises a common valve case which contains said first valve means, said throttle means, and said main valve means.

5. A control valve according to claim 1, wherein said pressure-receiving chamber of said first valve means includes first and second pressure-receiving chambers, for receiving pilot pressures, respectively, and said piston is designed to displace in a first direction by the pilot pressure applied to said first pressure-receiving chamber and to displace in a second direction opposite to said first direction by the pilot pressure applied to said second pressure-receiving chamber.

6. A four-wheel steering system for a vehicle having front and rear wheels which can be steered, comprising:

power steering means for generating hydraulic pressure to assist steering of said front wheels, in accordance with a steering state of a steering wheel;

in-phase steering means for generating hydraulic pressure output to turn said rear wheels in the same direction as that of said front wheels, in accordance with the hydraulic pressure generated from said power steering means;

anti-phase steering means for generating hydraulic pressure to turn said rear wheels in the direction opposite to that of said front wheels, in accordance with a rate of change in hydraulic pressure generated from said power steering means, said anti-phase steering means comprising a control valve which includes:

first valve means having a pair of pressure-receiving chambers for receiving the hydraulic pressure generated from said power steering means as pilot pressure, a piston movable in accordance with the difference between the pilot pressure applied to said pressure-receiving chambers and first and second output pressure chambers, volumes of which are increased and decreased, respectively, and vice versa, by the displacement of said piston, means for connecting said first and second output pressure chambers, throttle means arranged in the connecting means, for throttling the connecting means, and main valve means including an input port receiving hydraulic pressure, an output port outputting hydraulic pressure, a pair of pressure chambers communicating with said first and second output pressure chambers of said first valve means, respectively, and a valve member located between said pressure chambers and between said input and output ports to be movable in accordance with the pressure difference between said first and second output pressure chambers, for controlling the hydraulic pressure output from said output port in accordance with the position of said valve member; and hydraulic actuator means for synthesizing the hydraulic pressure outputs from said in-phase and anti-phase steering means and turning said rear wheels in response to the composite output.

7. A system according to claim 6, wherein said throttle means comprises variable throttle means including connecting means for connecting said first and second output pressure chambers to each other, and a throttle member disposed in said connecting means to be movable, for changing a throttle amount of said connecting means in accordance with the displacement of said throttle member.

8. A system according to claim 7, which further comprises first generating means for generating hydraulic pressure which varies in accordance with a speed of said vehicle, and wherein said variable throttle means includes pressure chambers defined in said connecting means on both sides of said throttle member and receiving the hydraulic pressure from said first generating means as pilot pressure, and said throttle member is movable in accordance with the pilot pressure applied to said pressure chambers.

9. A system according to claim 8, which further comprises second generating means for applying a constant hydraulic pressure to said input port of said main valve means.

10. A system according to claim 6, wherein said piston of said first valve means and said valve member of said main valve means are arranged to be movable in directions parallel to each other, and said control valve includes a common valve case which contains said first valve means, said throttle means, and said main valve means.

11. A system according to claim 6, wherein said pressure-receiving chamber of said first valve means includes first and second pressure-receiving chambers, for receiving pilot pressures, respectively, and said piston is designed to displace in a first direction by the pilot pressure applied to said first pressure-receiving chamber and to displace in a second direction opposite to said first direction by the pilot pressure applied to said second pressure-receiving chamber.

12. A system according to claim 6, wherein said main valve means includes a pair of pressure chambers which are defined on both sides of said valve member and communicate with said first and second output pressure chambers of said first valve means, respectively, and said valve member is movable in accordance with a pressure difference between said pressure chambers.

13. A control valve used in a hydraulic apparatus, comprising:
first valve means including a cylinder, and a piston arranged in said cylinder and defining in said cylinder first and second output pressure chambers, said piston being movable in accordance with hydraulic-pressure output rom a first hydraulic device to increase the volume of the first output pressure chamber and to decrease the volume of the second output pressure chamber, and vice versa;
means for connecting said first and second output pressure chambers to each other;
throttle means arranged in the connecting means, for throttling the connecting means; and
main valve means including an input port receiving hydraulic pressure, an output port outputting hydraulic pressure to a second hydraulic device, a valve member arranged between said input and output ports, and a pair of pressure chambers which are defined on both sides of the valve member and which communicate with said first and second output pressure chambers of said first valve means, respectively, said valve member being movable in accordance with the pressure difference between said first and second output pressure chambers, for controlling the hydraulic pressure output from said output port in accordance with the position of said valve member.

14. A four-wheel steering system for a vehicle having front and rear wheels which can be steered, comprising:
power steering means for generating hydraulic pressure to assist steering of said front wheels, in accordance with a steering state of a steering wheel;
means for turning said rear wheels in accordance with a state of applied hydraulic pressure; and
a control valve for controlling the operation of said rear wheel turning means, said control valve including:
first valve means having a cylinder, and a piston arranged in the cylinder and defining first and second output pressure chambers in the cylinder, said piston being movable in accordance with the hydraulic pressure output from said power steering means to increase the volume of the first output pressure chamber and to decrease the volume of the second output pressure chamber, and vice versa,
means for connecting said first and second output pressure chambers to each other,
throttle means arranged in the connecting means, for throttling the connecting means, and
main valve means including an input port receiving hydraulic pressure, an output port outputting hydraulic pressure to said rear wheel turning means, a valve member arranged between the input and output ports, and a pair of pressure chambers being defined on both sides of the valve member and communicating with said first and second output pressure chambers of said first valve means, respectively, said valve member being movable in accordance with the pressure difference between said first and second output pressure chambers, for controlling the hydraulic pressure output from said output port in accordance with the position of said valve member.

* * * * *